United States Patent [19]

Masse

[11] Patent Number: 4,693,405
[45] Date of Patent: Sep. 15, 1987

[54] THREADING BELT FOR PULP FLOATER DRYERS

[75] Inventor: Serge Masse, Lachine, Canada

[73] Assignee: Ross Pulp and Paper Inc., La Salle, Canada

[21] Appl. No.: 699,379

[22] Filed: Feb. 7, 1985

[51] Int. Cl.$^4$ .................. B65H 20/06; F26B 13/10; G03B 1/56
[52] U.S. Cl. ........................... 226/91; 34/158; 162/283; 226/173
[58] Field of Search ............... 226/91, 92, 170, 173; 34/158, 162; 271/205, 204, 277; 162/361, 358, DIG. 1, 193, 283

[56] References Cited

U.S. PATENT DOCUMENTS

| | | | |
|---|---|---|---|
| 1,658,095 | 2/1928 | Paschen | 242/68 |
| 1,658,096 | 2/1928 | Paschen | 226/173 X |
| 1,991,137 | 2/1935 | Case et al. | 34/162 X |
| 2,712,699 | 7/1955 | Fecht | 34/162 |
| 3,019,855 | 2/1962 | Engle | 34/158 X |
| 3,085,346 | 4/1963 | Allander et al. | 226/91 X |
| 3,237,316 | 3/1966 | Sachs | 34/158 X |
| 3,265,267 | 8/1966 | Wallin | 226/91 X |
| 3,399,465 | 9/1968 | Lanne et al. | 34/158 |
| 3,629,949 | 12/1971 | Knelson . | |
| 3,759,434 | 9/1973 | Lindstrum et al. . | |
| 4,030,728 | 6/1977 | Wallace et al. | 271/205 X |
| 4,070,839 | 1/1978 | Clem | 52/448 |
| 4,229,254 | 10/1980 | Gill | 162/361 X |
| 4,238,287 | 12/1980 | Gill | 162/361 X |
| 4,330,023 | 5/1982 | Cronin | 162/361 X |
| 4,543,160 | 9/1985 | Kerttula et al. | 226/91 X |

OTHER PUBLICATIONS

J. S. Rembeck, Conveyor Belt, IBM Technical Disclosure Bulletin, vol. 8, No. 6, 11-1965.

Primary Examiner—Stuart S. Levy
Assistant Examiner—Lynn M. Sohacki
Attorney, Agent, or Firm—Fay, Sharpe, Beall, Fagan, Minnich & McKee

[57] ABSTRACT

A threading belt (A) extends around a plurality of pulleys and guide rollers (B). A loading station (C) is disposed along a linear run of the threading belt for inserting a web between hingedly connected gripping portions (16, 18) of the threading belt. The loading station includes a wedge-shaped belt spreading member (52) for urging the gripping portions of the belt apart and providing a groove (60) through which the web is fed between the gripping portions. The threading belt conveys the web through a floating dryer (D) to an unloading station (E). The unloading station includes an ejector member (90) which spreads the belt and a nozzle (96) for directing a jet of air between the belt gripping portions to eject the web therefrom. The belt includes a main woven fabric strength member (24) extending along the hinged connection of the gripping portions. A fabric cover (20) surrounds the gripping and hinge portions and is impregnated with a silicon rubber (22). The silicon rubber defines inwardly facing, corrugated gripping surfaces (30, 32) of the gripping portion and hermetically seals the main strength member. Lip portions (12, 14) which include tensile strengthening members (26, 28) running longitudinally therein are connected with the free ends of the gripping portions.

12 Claims, 8 Drawing Figures

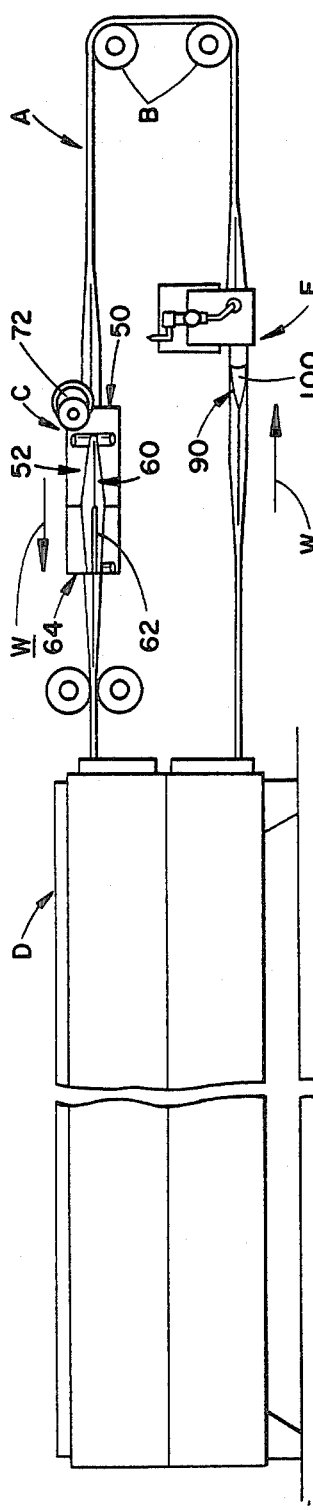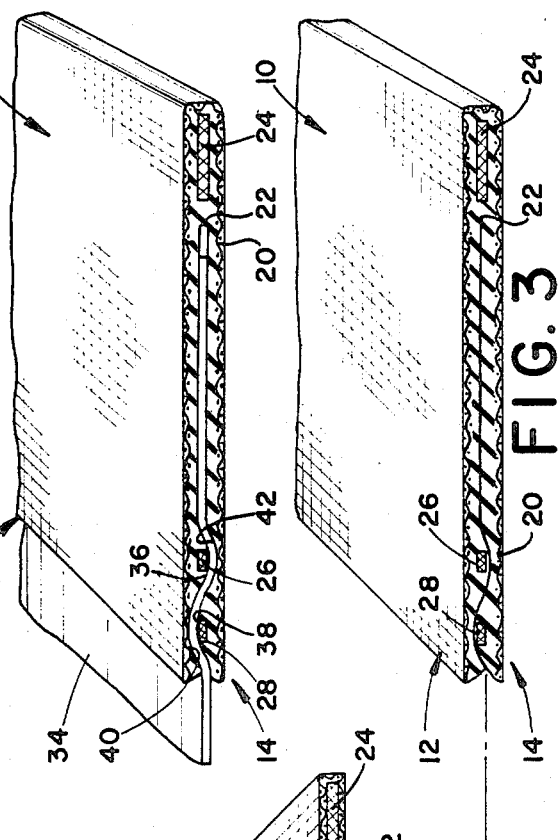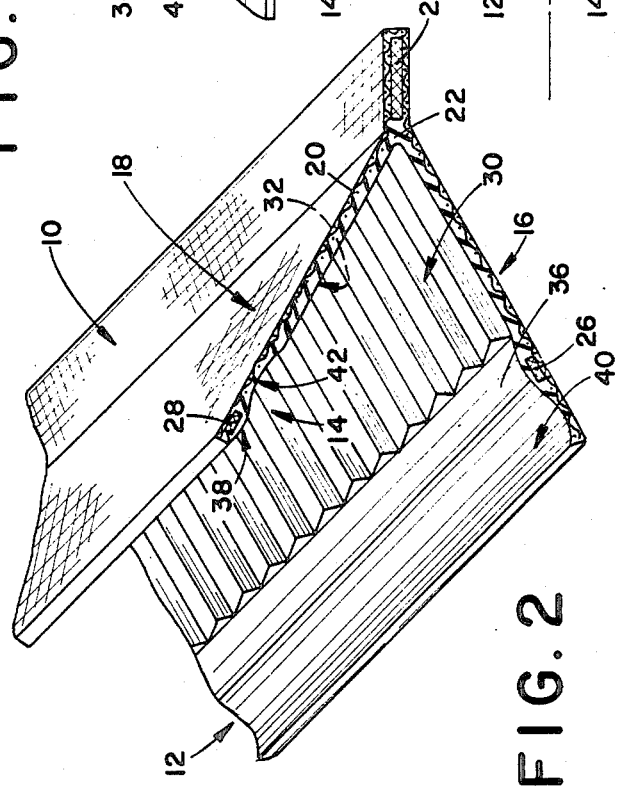

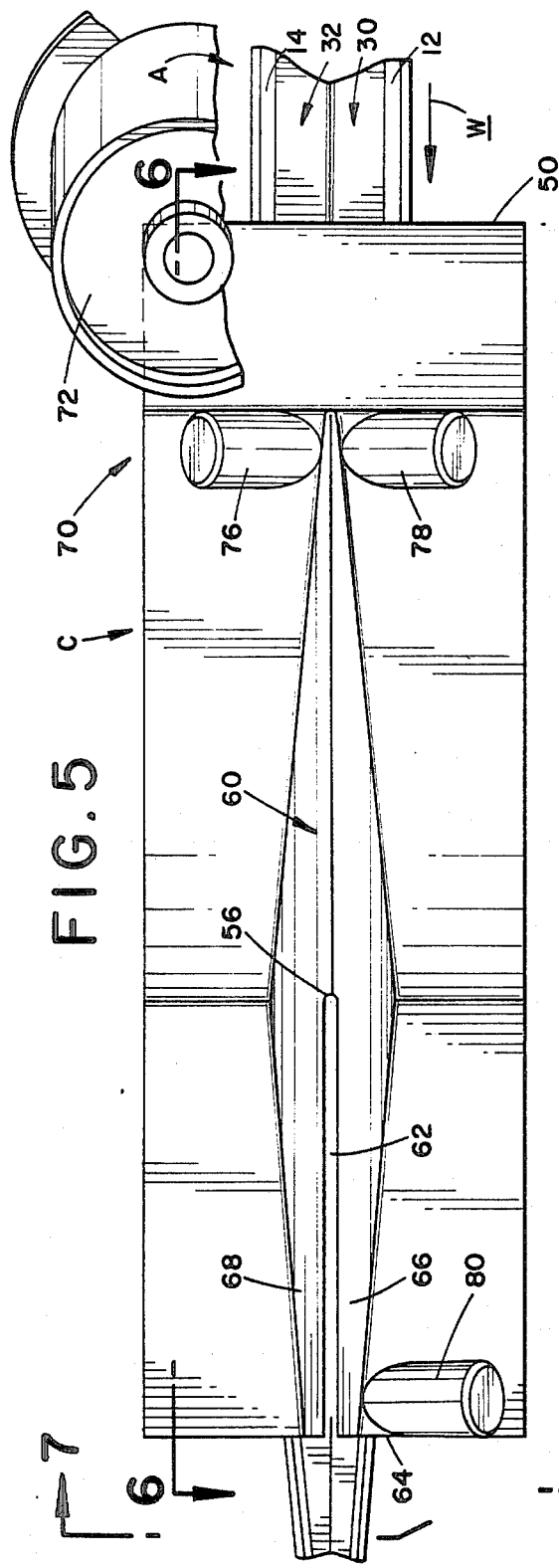
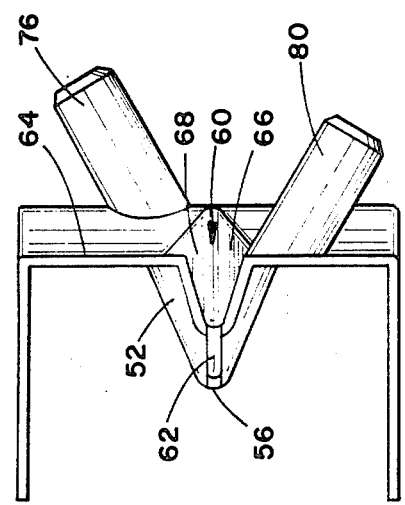
FIG. 5
FIG. 7

THREADING BELT FOR PULP FLOATER DRYERS

BACKGROUND OF THE INVENTION

The present invention relates to the art of conveying continuous and elongated webs. The invention finds particular application in threading pulp webs into pulp floater drying ovens and will be described with particular reference thereto. It is to be appreciated, however, that the invention is also applicable to feeding strips or sheets of other types through associated processing equipment.

Heretofore, conveyor systems have been disposed adjacent the normal path of pulp webs passing through drying ovens for initially threading the webs therethrough. Most commonly, these conveyor systems have included two endless chains or other flexible members which came together in linear runs extending back and forth along the length of the drying oven. Note, for example, U.S. Pat. No. 3,265,267, issued Aug. 9, 1966 to S. W. Wallin and U.S. Pat. No. 3,629,949, issued Dec. 28, 1971 to H. Knelson.

In other installations, the pair of endless conveyors was replaced with a single endless belt including two flat segments pivotally connected along a longitudinal edge thereof. The folded flat segments were flexed 180° to open the folded conveyor belt, commonly by passing the belt around a guide roller. See, U.S. Pat. No. 3,399,465, issued Sept. 3, 1968 to B. Lanne, et al. and U.S. Pat. No. 3,759,434, issued Sept. 18, 1973 to B. Lindstrum, et al.

Placing the hinged belts in the drying oven subjected the belts to extended periods of elevated temperatures which tended to degrade the flexible belt compositions causing premature belt failure, particularly at the hinge. The periodic flexing a full 180° to open the belt for receipt of a paper web aggravated the hinge failure problem.

The present invention contemplates a new and improved belt and belt system which overcomes the above-referenced problems and others.

SUMMARY OF THE INVENTION

In accordance with a first aspect of the present invention, a pulp web conveying system is provided which includes a theading belt having a pair of hingedly connected gripping portions for receiving the pulp web therebetween. A plurality of guide rollers guide the belt and urge it toward a closed configuration along a preselected workpath. The workpath includes at least one linear run disposed between a pair of spaced guide rollers. A loading station is disposed along the linear run for separating the gripping portions to an extent not exceeding approximately 90° for enabling the pulp web to be received therebetween. An unloading station disposed along the workpath separates the gripping portions to discharge the web from therebetween.

In accordance with another aspect of the invention, an improved threading belt is provided. A main strength member extends longitudinally of the belt and adjacent a first longitudinal edge thereof. A pair of longitudinally extending web gripping portions are hingedly connected adjacent the main strength member. The gripping portions define at least adjoining faces which are disposed together and parallel when closed to grip the web, and which are able to be spaced apart to receive and discharge the web. A pair of matingly engaging lip members are operatively connected longitudinally along a second longitudinal edge of the gripping portions opposite to the hinged connection.

According to another aspect of the invention, a tensile member is disposed in each of the lip members so as to extend longitudinally of the belt adjacent the second longitudinal edge. The main strength member and the lip tensile members are located in a manner such that they are generally coplanar when the belt gripping portions are disposed in gripping relation to each other. Such arrangement aids in rendering the cooperating, mating surfaces of the belt relatively movement free in a longitudinal direction.

One advantage of the present invention is the provision of a threading belt having great durability and an extended useful life.

Another advantage of the invention resides in the provision of a belt having high strength characteristics.

Yet another advantage of the invention is that it readily facilitates the threading of webs through dryers and other associated equipment.

Still another advantage of the invention is found in a threading belt which is constructed so that mating, web gripping surfaces are friction and wear free when the belt travels around pulleys and the like of an associated conveying apparatus.

A further advantage of the invention is the provision of a threading belt construction which insures against pulp web pullout from between opposed web gripping portions thereof.

Still further advantages of the present invention will become apparent to those of ordinary skill in the art upon a reading and understanding of the following detailed description of the preferred embodiment.

BRIEF DESCRIPTION OF THE DRAWINGS

The present invention may take physical form in certain parts and arrangements of parts, a preferred embodiment of which will be described in detail in this specification and illustrated in the accompanying drawings which form a part hereof and wherein:

FIG. 1 is a diagrammatic side view of a pulp web threading system formed in accordance with the present invention;

FIG. 2 is a perspective view of a section of the threading belt of FIG. 1 in an open configuration without a pulp web received therein;

FIG. 3 is a perspective view of a section of the threading belt of FIG. 2 in a closed configuration without a pulp web received therein;

FIG. 4 is a perspective view of a section of the threading belt of FIG. 2 in a closed configuration with a pulp web received therein;

FIG. 5 is an enlarged view of the loading station of FIG. 1;

FIG. 7 is an end view of the loading station of FIG. 1 in the direction of lines 7—7 of FIG. 5; and, FIG. 8 is an enlarged view of the unloading station of FIG. 1.

DETAILED DESCRIPTION OF THE PREFERRED EMBODIMENT

Figure 6:
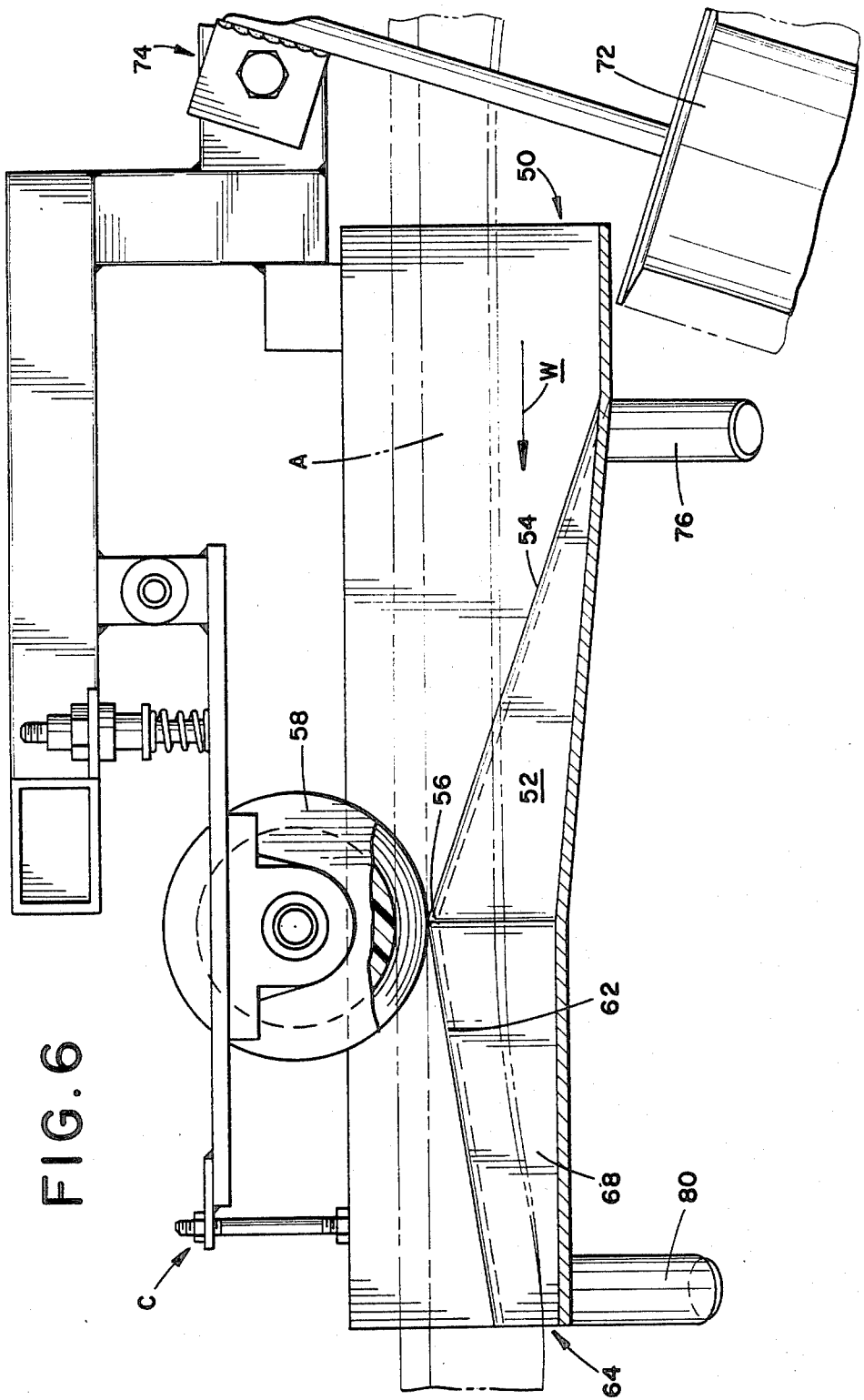
FIG. 6 is a cross-sectional view of the loading station taken along lines 6—6 of FIG. 5.

Referring now to the drawings wherein the showings are for purposes of illustrating a preferred embodiment of the invention only and not for purposes of limiting same, FIG. 1 shows a pulp web threading system having a threading belt A which passes along a workpath w defined by a plurality of pulleys and/or rollers B. A loading station C selectively opens the threading belt A to receive the pulp web. The threading belt conveys the pulp web along the workpath w through a floater dryer D or other downstream processing equipment to an unloading or discharge station E at which the web is separated from the threading belt.

With reference to FIGS. 2, 3, and 4, the threading belt A includes a hinge region 10 extending along a first longitudinal edge thereof and a pair of oppositely disposed lip regions 12 and 14 extending longitudinally along a second, opposite longitudinal edge. Generally flat web gripping portions 16 and 18 extend between the lips and the hinge region 10.

A fabric cover 20, such as an aramid fiber fabric, extends around the outer surface of the hinge, lip, and gripping portions of the belt. The fabric cover is impregnated with a polymeric material 22, such as silicon rubber, to form a unitary construction with a polymeric interior layer of the belt. A main strengthening member 24 extends through the hinge portion along the first edge of the belt. The main strengthening member comprises a woven band of aramid polymer fibers with minimal elastic stretch which are impregnated with the silicon rubber material 22 to be sealed air-tight therein. The polymeric material seals the polymer fibers from oxygen and air, and protects against heat, oxygen, and water to inhibit degradation of the fibers. Optionally, other fibers which are resistant to heat degradation, oxygen and vapors, and have longitudinal resiliency and high strength may be incorporated in the main strengthening member.

A pair of lip tensile members 26 and 28 extend longitudinally along the lip portions adjacent the second longitudinal edge of the belt. In the preferred embodiment, the lip tensile members comprise woven aramid fibers, although other materials having high strength under tension and 8% elastic stretch or better, may also be used. The lip tension members are also imbedded with the polymeric material 22 to protect the fibers from oxygen, vapors and thermal gradients.

In the preferred embodiment, the inner face of the gripping portions 16, 18 have meshing corrugations 30, 32, respectively, which pull a pulp web 34 along the workpath. The lip portions 12, 14 have complimentary, generally S-shaped transverse cross sections with relatively smooth mating surfaces. The S-shaped regions have longitudinally extending projecting portions 36, 38 for receiving the tensile members 26, 28, respectively, and longitudinal valley portions 40, 42. The valley portion of one lip accommodates the tensile member containing projecting portion of the other in a smooth mating relationship.

Fabric cover 20, impregnated wtih polymeric material 22, and corrugations 30, 32 cause hinge 10 to be stiff and normally closed. With such construction, mating surfaces 30 and 32, 38 and 40, and 36 and 42 are helf firmly against each other when pulp web 34 is not interposed between gripping portions 16, 18. Accordingly, when threading belt A conveys the pulp web along long or extended spans between adjacent ones of pulleys and/or rollers B, the stiffness of hinge 10 insures against pulp web pullout from between gripping portions 16, 18.

According to the preferred construction, lip tensile members 26, 28 are disposed substantially coplanar with main strengthening member 24 (FIGS. 2 and 3). This arrangement, along with a suitable design of fabric cover 20, render mating surfaces 30 and 32, 38 and 40, and 36 and 42 relatively movement free in a longitudinal direction. As a result, these mating surfaces are substantially friction and wear free when threading belt A travels over a plurality of pulleys and/or rollers B (FIG. 1) without conveying pulp web 34. The foregoing arrangement, coupled with the suitable design of elasticity for strength members 24, 26, 28, renders the pulp web substantially wear free, thus break free, when conveyed over a plurality of pulleys and/or rollers B, and through a floater dryer D in a manner to be described.

In operation, the threading belt A is conveyed in a closed, empty orientation as shown in FIG. 3 to the loading station C. At the loading station, the lip and gripping portions are separated such that the belt is in an open, empty configuration as shown in FIGURE 2. The loading station plants or inserts the pulp web 34 between the web gripping portions as the threading belt returns to the closed orientation with the web disposed therebetween as illustrated in FIG. 4. The belt conveys the pulp web through the dryer D to the unloading station E where the gripping portions are again separated to disassociate the belt and the web. As the web is being threaded through the dryer from the web leading end, the side edge of the web will gradually shift transversely out of engagement with the belt and continue to pass through the dryer without further assistance from the belt. The construction of threading belt A as described above in detail advantageously provides the belt with an anti-slip-off feature. That is, when relative movement occurs between the belt and a support or guide pulley, the belt remains on top of the cone of the pulley, whereas an ordinary flat belt would fall off the pulley when relative movement occurred.

With reference again to FIG. 1, and with further reference to FIGS. 5, 6, and 7, the loading station C selectively opens the belt A to the orientation of FIG. 2 for receiving web 34 therein, and then allows the belt to close resiliently around the web. The loading station has an inlet end 50 in which the belt is received in generally a slightly or partially opened condition (FIG. 1). A hollow, wedge-shaped belt spreading member 52 engages the belt lips 12, 14 at a spreading member leading edge 54 (FIG. 6). As the belt moves along the diverging wedge-shaped member 52, the pulp web gripping portions 16, 18 of the belt are progressively separated to about 60° adjacent an apex portion 56 thereof where the spreading member has its maximum thickness dimension (FIGS. 5 and 7). Between the leading edge 54 and the apex portion 56, the belt spreading member both diverges and extends deeper into the belt, reaching substantially to an area adjacent the hinge 10 at apex portion 56 (FIG. 6). A belt guide member, such as a grooved roller 58, retains the belt hinge in close priximity to the belt spreading member apex portion 56 to assure that the belt is opened to the appropriate degree.

The pulp web 34 is received in the groove or pocket-like area 60 defined by the opposed interior surfaces of the hollow spreading member 52. An elongated slot 62 communicates between the interior and exterior of the spreading member and extends coplanar with the workpath from the apex portion 56 to a trailing end 64 of the loading station. At the apex portion, slot 62 is adjacent the belt hinge 10 to facilitate insertion of the web deep into the belt. Web guide members 66 and 68 converge inwardly toward each other from adjacent the wedge member apex portion 56 to the trailing end 64 for allowing the belt to close around the pulp web. The guide members extend a progressively less distance into the belt toward the trailing end to permit progressively greater frictional engagement between the belt and the web.

Loading station C further includes a web guiding system 70 for guiding the web adjacent the threading groove 60 and slot 62. This guiding system includes a large roller 72 disposed above a center line of the belt spreading wedge 52 and workpath for selectively engaging an upper surface of the web. The large roller inhibits whipping movement of the web as it is pulled rapidly along with the threading belt. A pivot arrangement 74 enables the roller to be pivoted away from the workpath of the pulp web after the web has been threaded through the dryer. A pair of web guide members 76, 78 are arranged in a generally V-shaped relationship adjacent leading edge 54 of the belt spreading wedge for guiding the web into pocket-like area 60. A further guide member or roller 80 is disposed below the outlet end of the load station to support the web as it moves therepast. Guide members 76, 78, 80 may comprise roller-like members constructed of a suitable plastic or other material and mounted in the desired supporting positions by suitable brackets or the like (not shown).

Figure 8:
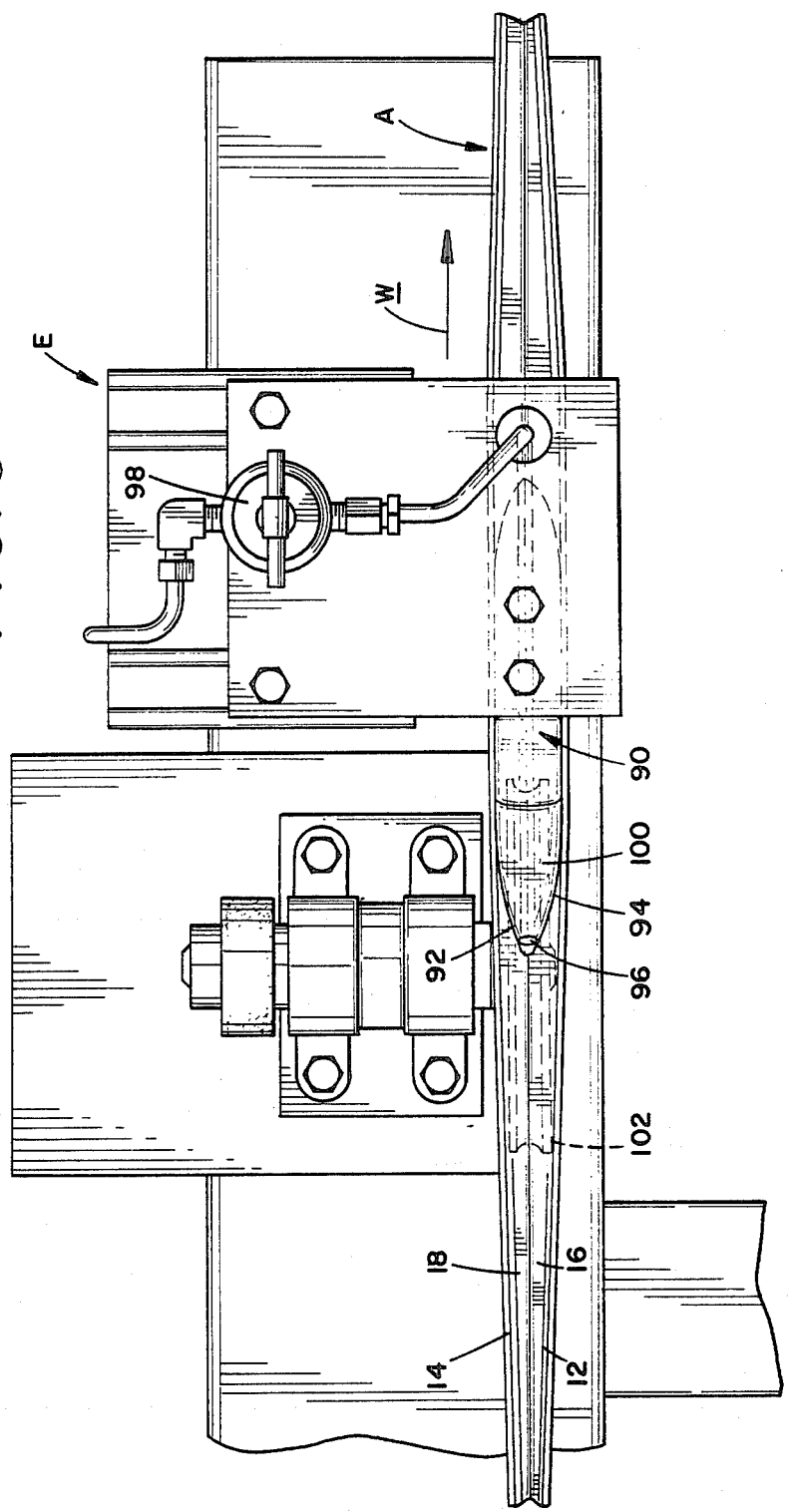

With continued reference to FIG. 1, and with further reference to FIG. 8, the unloading station E includes a generally wedge-shaped ejector member 90 having tapered sides 92, 94. The ejector member cams the belt gripping portions outwardly apart from each other toward the open position to release the frictionally engaged relationship with the web. An air nozzle 96, disposed adjacent a leading end of the ejector member, directs a jet of air upstream along the interior of the belt to urge the web to become disengaged from the belt. An air pressure regulator 98 facilitates selective regulation of the ejection force by allowing control of the air pressure which is supplied to the nozzle. An angled web deflecting surface 100 deflects the web out of the belt. A belt guide roller 102 urges the hinged region 10 of the belt against the ejector member 90.

In use, and once web 34 has been properly threaded through dryer D by means of belt A, loading station C, and discharge station E as described above, the belt may continue to run along the workpath or it may be shut down. This is possible since, again, the belt, loading station, and discharge station are only used for properly threading a web through the dryer, and the web is thereafter self-sustaining therein. Thus, as noted above, when the web leading end portion is being threaded through the dryer by belt A, the side edge of the web will gradually shift out of engagement with the belt at loading station C. When this portion of the web subsequently reaches discharge station E, the threading belt is no longer required until it becomes necessary to thread a new web through the dryer.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A paper pulp web threading system comprising:
   (a) a threading belt for selectively conveying a paper pulp web therewith, the threading belt including:
      a main strength member extending longitudinally adjacent a first longitudinal edge of the belt, said main strength member comprising woven synthetic fibers having high tensile strength and minimal elastic stretch;
      a polymeric material encompassing the main strength member to form a hermetic seal therearound, the polymeric material defining a pair of gripping portions for gripping the web therebetween, the gripping portions being hingedly connected adjacent the main strength member;
      a pair of matingly interengaging lip portions wherein each lip portion includes a tensile member extending longitudinally therethrough and each lip portion is operatively connected with one of the gripping portions adjacent a second longitudinal edge of the belt;
      said lip tensile members comprise woven synthetic fibers embedded within the polymeric material, the woven fibers being longitudinally stretchable yet having high tensile strength; and,
      said lip tensile members being capable of at least 8% elastic stretch;
   (b) guide rollers for guiding the threading belt along a preselected workpath;
   (c) a loading station disposed along the workpath for selectively loading the web between the belt gripping portions;
   (d) a pulp web dryer disposed along the workpath downstream from the loading station; and,
   (e) an unloading station disposed downstream from the dryer for removing the web from the threading belt.

2. A threading belt comprising:
   a main strength member extending longitudinally adjacent a first longitudinal edge of the belt; said main strength member comprising woven synthetic fibers having high tensile strength;
   a polymeric material encompassing the main strength member to form a hermetic seal therearound, the polymeric material defining a pair of gripping portions for gripping a web therebetween, the gripping portions being hingedly connected adjacent the main strength member;
   a pair of lip portions which matingly interengage, each lip portion being operatively connected with one of the gripping portions adjacent a second longitudinal edge of the belt; and,
   lip tensile members extending longitudinally through the lip portions, said lip tensile members disposed to lie generally coplanar with each other and with the main strength member when the grippng portions are disposed in gripping relation to each other and having high tensile strength and being stretchable longitudinally to provide strength to the belt while permitting longitudinal stretching thereof.

3. The belt as set forth in claim 2 further including a fabric cover extending around the outer surface of the lip portions, the gripping portions, and the main strength member, the fabric cover being impregnated with the polymeric material.

4. The belt as set forth in claim 2 wherein the polymeric material defines inwardly facing, engaging faces of the gripping portions, the polymeric material defining a plurality of meshing corrugations extending along the gripping portion faces for engaging the web therebetween.

5. The belt as set forth in claim 8 wherein the lip portions have relatively smooth inwardly facing surfaces.

6. The belt as set forth in claim 5 wherein the lip portions each have a longitudinally extending projection portion and a longitudinally extending recess, the longitudinally extending recess of one lip portion being adapted for mating engagement with the longitudinally extending projection of the other.

7. The belt as set forth in claim 6 wherein the lip tensile members and the main strength member comprise woven synthetic fibers embedded with the polymeric material, the woven fibers being longitudinally stretchable yet having high tensile strength.

8. A web threading system comprising:
  a threading belt including hingedly connected gripping portions for receiving a web therebetween;
  said main strength member comprising woven synthetic fibers having high tensile strength and minimal elastic stretch;
  a pair of lip portions each connected adjacent a longitudinal edge of the gripping portions opposite the main strengthening member; each lip portion including longitudinally extending tensile members lying coplanar with each other and with said main strengthening member when said lip portions are in gripping relationship;
  a plurality of guide rollers for guiding the threading belt along a preselected workpath, the workpath including at least one linear run;
  a loading station disposed along the liner run for separating the gripping portions less than 90° to facilitate receipt of the web therebetween; and,
  an unloading station for separating the gripping portions to discharge the web from therebetween.

9. The threading system as set forth in claim 8 wherein a fabric cover is disposed along outer surfaces of the lip portions, the gripping portions, and the hinge region, and wherein a polymeric material defines inwardly facing surfaces of at least the gripping portion, the polymeric material being impregnated into the fabric cover and the main strengthening member.

10. The threading system as set forth in claim 8 wherein each lip portion includes a longitudinally extending projection and a longitudinally extending recess which matingly engages the longitudinally extending projection of the other lip portion.

11. The threading system as set forth in claim 10 wherein each lip portion projection includes a tensile strengthening member extending longitudinally therethrough.

12. The threading system as set forth in claim 11 wherein the tensile strengthening members are generally coplanar with the main strengthening member when the gripping portions are disposed in gripping relation to each other.

* * * * *

UNITED STATES PATENT AND TRADEMARK OFFICE
CERTIFICATE OF CORRECTION

PATENT NO. : 4,693,405
DATED : September 15, 1987
INVENTOR(S) : S. Masse

It is certified that error appears in the above-identified patent and that said Letters Patent is hereby corrected as shown below:

Column 3, line 59 " helf "

should read -- held --

Column 7, Claim 8 line 19 after "therebetween" and before "said main strength" insert

-- a main strengthening member extending along a hinge region disposed longitudinally along the hinged connection of the gripping portions --

Signed and Sealed this

Twentieth Day of September, 1988

Attest:

DONALD J. QUIGG

*Attesting Officer*     *Commissioner of Patents and Trademarks*